US008701952B1

(12) United States Patent
Tripp

(10) Patent No.: US 8,701,952 B1
(45) Date of Patent: Apr. 22, 2014

(54) TOOL STORAGE ORGANIZER

(76) Inventor: Byron Z. Tripp, Fremont, CA (US)

( * ) Notice: Subject to any disclaimer, the term of this patent is extended or adjusted under 35 U.S.C. 154(b) by 0 days.

(21) Appl. No.: 13/591,475

(22) Filed: Aug. 22, 2012

(51) Int. Cl.
*A45F 3/14* (2006.01)
*B60R 9/00* (2006.01)
*A45F 4/00* (2006.01)
*A45F 3/00* (2006.01)

(52) U.S. Cl.
USPC ............................ 224/543; 224/572; 224/560

(58) Field of Classification Search
USPC ................. 224/563, 223, 572, 583, 677, 904; 206/373
See application file for complete search history.

(56) References Cited

U.S. PATENT DOCUMENTS

| | | | | |
|---|---|---|---|---|
| 1,176,598 A | * | 3/1916 | Pollgreen | 190/111 |
| 1,656,339 A | * | 1/1928 | Runyan | 224/275 |
| 2,171,676 A | * | 9/1939 | Wallace | 2/48 |
| 2,507,842 A | * | 5/1950 | Waddill | 224/560 |
| 2,576,327 A | * | 11/1951 | Wright | 224/547 |
| 2,697,465 A | * | 12/1954 | Johnson | 383/4 |
| 2,767,895 A | | 10/1956 | Smith | |
| 2,835,425 A | * | 5/1958 | Shultz | 224/558 |
| 3,151,649 A | * | 10/1964 | Mitchell, Jr. | 383/22 |
| 3,165,247 A | * | 1/1965 | Burns | 224/275 |
| 3,181,751 A | * | 5/1965 | Wilson | 383/39 |
| 3,717,188 A | * | 2/1973 | Green | 224/42.11 |
| 3,876,126 A | * | 4/1975 | Kearney | 224/401 |
| 4,260,091 A | * | 4/1981 | French et al. | 224/311 |
| D266,195 S | | 9/1982 | Bennett | |
| 4,901,899 A | * | 2/1990 | Barrett | 224/223 |
| 4,953,765 A | * | 9/1990 | Little et al. | 224/583 |
| 4,974,760 A | * | 12/1990 | Miller | 224/407 |
| 5,002,401 A | * | 3/1991 | Blackman | 383/38 |
| 5,040,711 A | * | 8/1991 | Niederhauser et al. | 224/572 |
| 5,154,331 A | * | 10/1992 | Sanders | 224/407 |
| D345,237 S | * | 3/1994 | Stein | D32/53 |
| 5,326,175 A | * | 7/1994 | Carter | 383/22 |
| 5,337,907 A | * | 8/1994 | McKenzie et al. | 211/88.01 |
| D352,260 S | * | 11/1994 | Adamo | D12/133 |
| D354,728 S | * | 1/1995 | Shink | D12/422 |
| 5,513,789 A | * | 5/1996 | Woods et al. | 224/407 |
| 5,653,337 A | * | 8/1997 | Cirigliano | 206/373 |
| 5,692,608 A | * | 12/1997 | Simien | 206/320 |
| 5,743,650 A | * | 4/1998 | Shannon et al. | 383/16 |
| 5,836,497 A | * | 11/1998 | Pelish | 224/677 |
| 5,941,437 A | * | 8/1999 | Okumura | 224/585 |
| 6,085,902 A | * | 7/2000 | Fang | 206/373 |
| 6,119,909 A | * | 9/2000 | Dancyger | 224/683 |
| 6,179,185 B1 | * | 1/2001 | Dancyger | 224/576 |
| D447,999 S | | 9/2001 | Thomson | |
| 6,402,002 B1 | * | 6/2002 | Benton | 224/600 |
| 6,604,659 B1 | * | 8/2003 | Graves | 224/683 |
| D487,656 S | | 3/2004 | Sturhan et al. | |

(Continued)

*Primary Examiner* — Justin Larson
*Assistant Examiner* — Lester L Vanterpool

(57) ABSTRACT

The present invention features a tool storage organizer system. The system comprises a storage organzer installed on the back wall of the truck cabin. The organizer has a back support per with multiple layers of pocket disposed in the front and multiple horizontal pockets disposed in the back. The multiple layer pockets in the front have various heights but the same bottom ending levels. A plurality of bits slots are attached to pockets of the out layer pockets. The back support panel has multiple grommets near the to edge, which are used to attach to brackets installed on truck wall through a plurality of hooks. A hard rod is attached to the top edge of the back support panel to keep the support in shape when the back support panel is hanged up.

12 Claims, 3 Drawing Sheets

(56) References Cited

U.S. PATENT DOCUMENTS

| | | |
|---|---|---|
| 6,763,986 B2 | 7/2004 | Santos et al. |
| 6,789,714 B1 * | 9/2004 | Benson et al. ............... 224/584 |
| 7,000,810 B1 * | 2/2006 | Farmer ......................... 224/404 |
| 7,028,870 B2 * | 4/2006 | Valdez-Campbell ......... 224/153 |
| D527,869 S * | 9/2006 | Knigge ........................ D2/864 |
| 7,210,689 B2 | 5/2007 | Guirlinger |
| 7,318,542 B2 * | 1/2008 | Godshaw et al. ............ 224/674 |
| 7,350,681 B2 | 4/2008 | Polburn et al. |
| 7,748,584 B2 * | 7/2010 | Easom ......................... 224/401 |
| 7,891,733 B1 | 2/2011 | Clarke |
| 2004/0182902 A1 * | 9/2004 | Smith et al. .................. 224/674 |
| 2006/0086769 A1 * | 4/2006 | Godshaw et al. ............ 224/625 |
| 2006/0196908 A1 * | 9/2006 | DeAntoni ..................... 224/904 |
| 2006/0278677 A1 * | 12/2006 | Lyle ............................ 224/661 |
| 2006/0283899 A1 | 12/2006 | Hill |
| 2007/0039986 A1 * | 2/2007 | Tomasi ........................ 224/401 |

\* cited by examiner

TOOL STORAGE ORGANIZER

FIELD OF THE INVENTION

The present invention relates to a device for tool storage organizer and more particularly, a tool storage organizer that is designed for usage inside a truck.

BACKGROUND OF THE INVENTION

Tool box and tool chest are well known for most truck drivers or handyman. Tool boxes are typically piled with hardware inside and thus do not have the best visual display to quickly locate a tool. There is a need for a tool storage organizer with large display capacity for quick locating a tool needed so that the user can improve his/her work efficiency.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims

SUMMARY OF THE INVENTION

The present invention features a tool storage organizer system. The system comprises a storage organizer installed on the back wall of the truck cabin. The organizer has a back support panel with multiple layers of pocket disposed in the front and multiple horizontal pockets disposed in the back. The multiple layer pockets in the front have various heights but the same bottom endng levels. A plurality of bits slots are attached to pockets of the out layer pockets. The back support panel has multiple grommets near the top edge, which are used to attach to brackets installed on truck wall through a plurality of nooks. A hard rod is attached to the top edge of the back support panel to keep the support in shape when the back support panel is hanged up.

DESCRIPTION OF PREFERRED EMBODIMENTS

Figure 1:
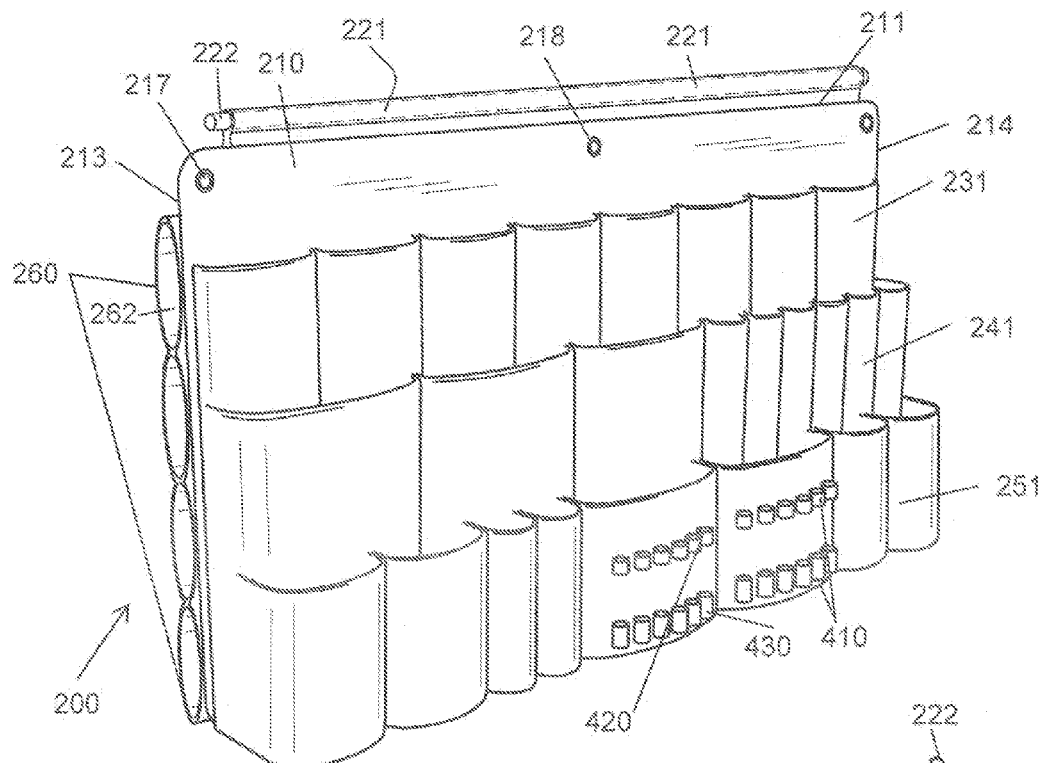
FIG. 1 shows an isometric view of the tool storage organizer.
Figure 2:
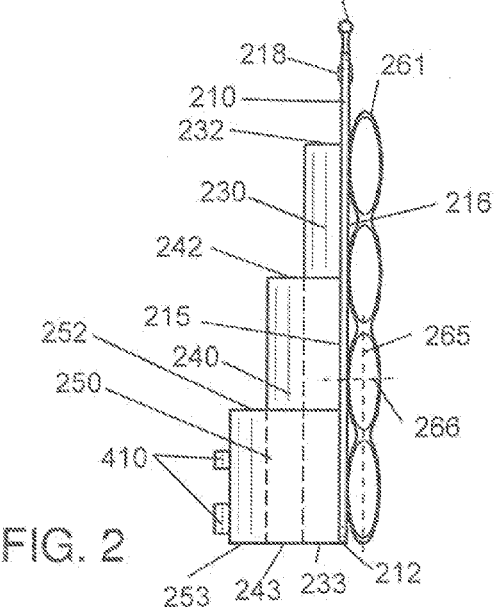
FIG. 2 shows a side view of the tool storage organizer.
Figure 3:
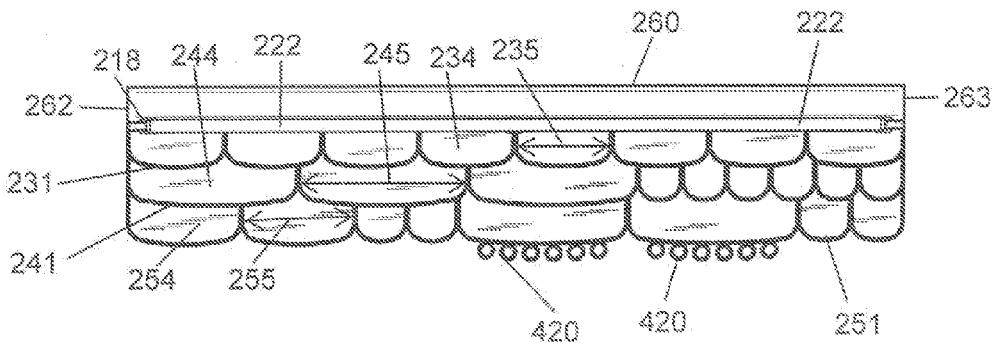
FIG. 3 shows a top view of the tool storage organizer.
Figure 4:
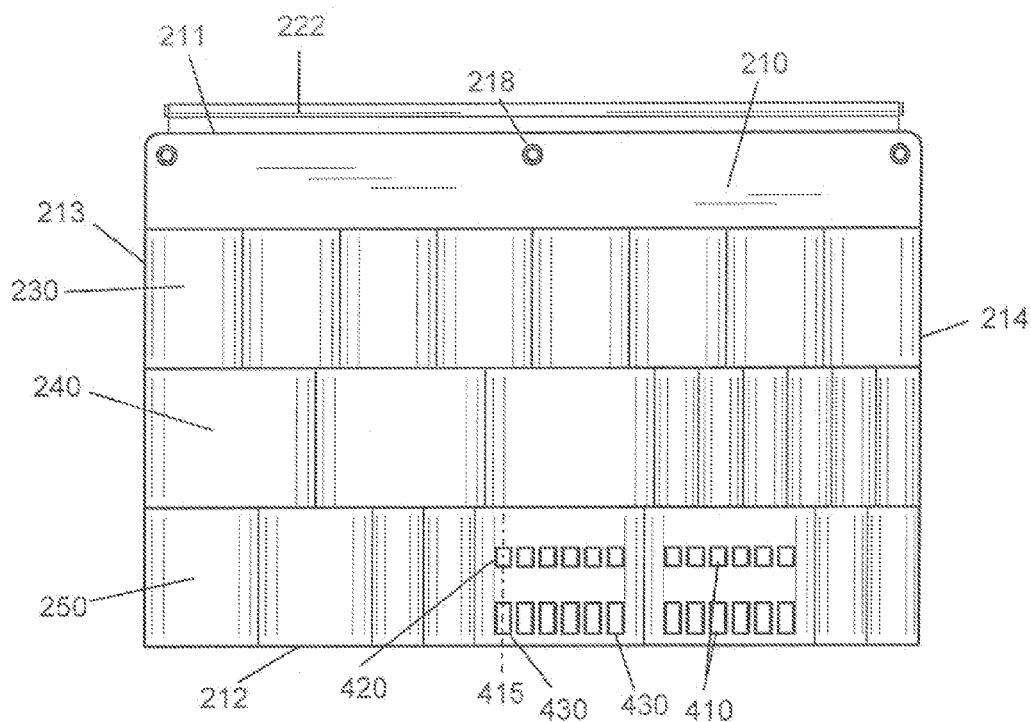
FIG. 4 shows a front view of the tool storage organizer.
Figure 5:
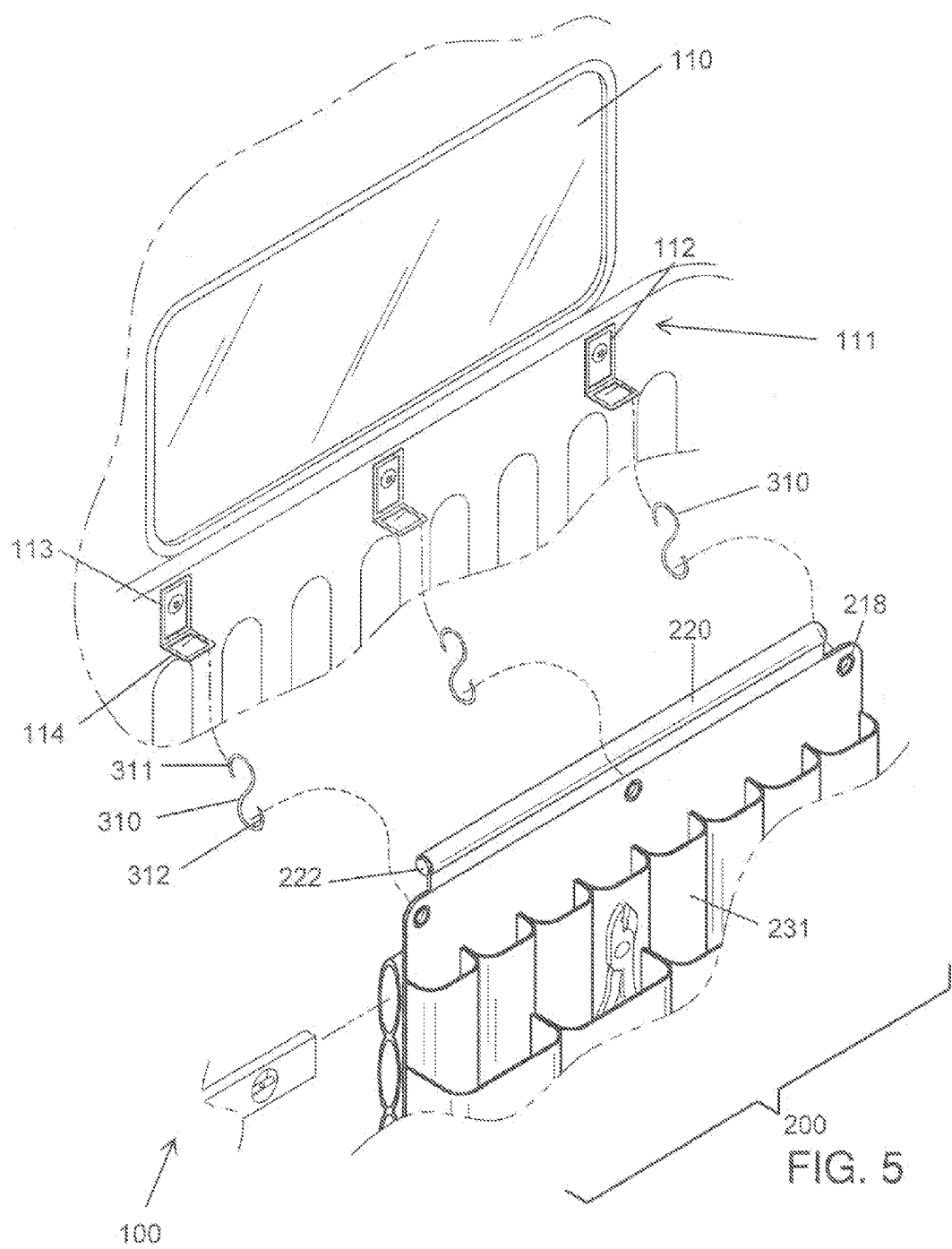
FIG. 5 shows an in-use view of tool storage organizer.

Referring now to FIG. 1-6 the present invention features a tool storage organizer system (100). The system comprises a truck (110) with cabin rear wall (111), a tool storage organizer (200).

A plurality of brackets (112) are disposed on a cabin wall (111) of a truck (not shown in Figure) preferably below a pickup rear window (110), wherein the bracket (112) has a first arm (113) with a distal end and proximal end, and a second arm (114) with a distal end and proximal end, wherein the first arm (113) are attached to the said wall (112) via a secure means (115), wherein the proximal and of the second arm (114) connected to the proximal end of the first arm (113) perpendicularly, wherein the second arm (114) has an opening disposed on the arm. In some embodiments, the wherein the brackets (112) are made of hard materials, such as metal, metal alloy or hard plastics.

The too organizer (200) comprises a rectangle back support panel (210) having a top edge (211), a bottom edge (212), a first edge (213), a second edge (214), a front surface (215) and a back surface (216), wherein the top edge (211) is parallel to the bottom edge (212), wherein the first edge (213) is parallel to the second edge (214), wherein the top edge (211) is perpendicular to the first edge (213), wherein a plurality of holes (217) are disposed near the top edge (211), where a grommet (218) is inserted into each said hole (217). In some embodiments, the grommet (218) is made of made of metal, plastic, or rubber. The grommet (218) is used to prevent tearing or abrasion of the pierced area of the back support panel (210). In some embodiments, the back support panel (200) is made of fabrics, cloth or denim A rod support (220) is firmly attached to the top edge (211) of the said back support panel (210), wherein the rod support (220) has cylindrical shape with an elongated opening (221), wherein a hard rod (222) is inserted into the said elongated opening (221). In some embodiments, the elongated opening (221) of the rod support (220) and hard rod (222) is circular in cross-section. In some embodiments, the elongated opening (221) of the rod support (220) and the hard rod (222) is oval or rectangle or square in cross-section. The hard rod (222) is made of hard materials, such as metal, metal alloy, hard wood or Polyvinyl chloride (PVC An inner layer (230) comprising a plurality of pockets (231) is disposed on the said front surface (215) of the back support panel (210), wherein the pockets (231) are adjacent to each other in parallel with top opening (232) and lower end (233), wherein the lower end (233) is aligned with the said bottom edge (212) of the said back support panel (210), wherein the top openings of the pockets (230) in the inner layer (230) are on the same height below the top edge (220) of the tool organizer (200). In some embodiments, the pockets (231) have the same opening width. In some embodiments, the pockets (231) have different opening width.

A middle layer (240) comprising a plurality of pockets (241) is disposed in front of the inner layer (230), wherein the pockets (241) are adjacent to each other in parallel with top opening (242) and lower end (243), wherein the lower end (243) is aligned with the said lower end (232) of the said ockets (231) in the inner layer (230), wherein the top openings of the pockets (241) in the middle layer (240) are on the same height below the top openings of the pockets (231) in the inner layer (230), wherein the pockets (241) in the middle layer (240) has an inner cavity (244) extending from the said top opening (242) to the said lower end (243). In some embodiments, the pockets (241) have the same opening width (245). In some embodiments, the pockets (241) have different opening width (245). In some embodiments, at least one of the pockets (241) in the middle layer (240) has a width (245) larger than the width (235) of the pockets (231) in the inner layer (230) and at least one of the pockets (241) in the middle layer (240) has a width (245) smaller than the width (235) of the pockets (231) in the inner layer (230). Such unequal width arrangements would be advantageous in properly stong tools of different width.

A front layer (250) comprising a plurality of pockets (251) is disposed in front of the middle layer (240), wherein the pockets (251) are adjacent to each other in parallel with top opening (252) and lower end (253), wherein the lower end (253) is aligned with the said lower end (252) of the said pockets (231) in the middle layer (240), wherein the top openings of the pockets (251) in the front layer (250) are on the same height below the top openings ot the pockets (241) in the middle layer (240), wherein the pockets (251) in the front layer (250) has an inner cavity (254) extending from the said top opening (252) to the said lower end (253) in some embodiments, the pockets (251) have the same opening width (255). In some embodiments, the pockets (251) have different opening width (255). In some embodiments, at least one of the pockets (251) in the front layer (250) has a width (255) larger than the width (235) of the pockets (231) in the inner layer (230) and at least one of the pockets (251) in the front layer (250) has a width (255) smaller than the width (235) of the pockets (231) in the inner layer (230). Such unequal width arrangements would be advantageous in property storing toots of different width.

A back layer (260) comprising a plurality of horizontal pockets (261) is disposed on the back surface (216) of the said back support panel (210), wherein the horizontal pockets (261) are adjacent to each other in parallel with an inner cavity extending from a first opening (262) to a second opening (263), wherein the first openings of all the pockets (262) in the back layer (250) are all aligned with the first edge (213) of the back support panel (210), wherein the second openings of all the pockets (263) in the back layer (250) are all aligned with the second edge (214) of the back support panel (210). In some embodiments, the horizontal pockets (261) in the said back layer (260) are all the same oval shape in cross-section. The horizontai pockets (261) have the longer center axis (265) parallel to the first edge (213) of the back support panel (210) and the shorter center axis (266) perpendicular to the first edge (213) of the back support panel (210). In some embodiments, the distance between the first arm (113) of the said bracket (112) and the distal end of the second arm (114) of the said bracket is the same or larger than the width (267) of the horizontal pockets (261) such that there is enough space for the bracket to hold the said tool organizer (200).

The tool storage organizes system (100) further comprises a plurality of hooks (310), wherein each of the hooks has a first end (311) and a second end (312), wherein the first end (311) is connected to the said second arm of the bracket (112), wherein the second arm (312) is connected to the said grommet (218).

In some embodiments, the tool storage organizer system (100) further comprises a plurality of bit slots (410) disposed on the said front layer (250), wherein each bit slot comprises a top piece (420) and bottom piece (430), wherein the top piece and bottom piece are not connected, wherein both the top piece and the bottom piece are cylindrical shape with the same inner diameter, where both the top piece (420) and bottom piece (430) are aligned to the same vertical axis (415), wherein the vertical axis (415) is parallel to the first edge of the back support panel (210). The top piece (420) has a top opening (422) and bottom opening (424), wherein the top opening (422) of the top piece (420) is blow the top opening (252) of the pockets (251) in the front layer (250), wherein bottom piece (430) has a top opening (432) and bottom end (434), wherein the bottom end (434) of the bottom piece (430) is above the bottom end (253) of the pockets (251) in the front layer (250), wherein the bottom end (253) of the bottom piece (430) is sealed. In some embodiments, the bit slots (410) have the same inner diameter. In some embodiments, the bit slots (410) have different inner diameter such that bits of different size can be selectably fitted in the proper bit slots. The inner diameter ranges from 1 millimetre to 15 millimetres or ranges from ⅛ inch to 5 inches As used herein, the term 'about' refers to plus or minus 10% of the referenced number.

The disclosures of the following U.S. Patents are incorporated in their entirety by reference herein: U.S. Pat. No. 2,767,895, U.S. Pat. No. 6,763,986, U.S. Pat. No. 7,201,689, U.S. Pat. No. 7,350,681, U.S. Pat. No. 7,891,733, U.S. Patent Application Publication No. 2000/0283899. U.S. Pat. No. D266,195,195, U.S. Pat. No. D447,999 and U.S. Patent No. D487,656.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claima.

The reference numbers recited in the below claims are solely for ease of examination of this patent application, and are exemplary, and are not intended in any way to limit the scope of the claims to the particular features having the corresponding reference numbers in the drawings.

What is claimed is:

1. A tool storage organizer system (100) for storing hardware tool inside a truck, the system comprising:
   (a) a truck with cabin wall (111), wherein a plurality of brackets (112) are disposed on the said wall (111), wherein the bracket (112) has a first arm (113) with a distal end and proximal end, and a second arm (114) with a distal end and proximal end, wherein the first arm (113) are attached to the said wall (112) via a secure means (115), wherein the proximal end of the second arm (114) connected to the proximal end of the first arm (113) perpendicularly, wherein the second arm (114) has an opening disposed on the arm;
   (b) a tool organizer (200) to store hardware tools, wherein the tool organizer comprising;
      (i) a rectangle back support panel (210) having a top edge (211), a bottom edge (212), a first edge (213), a second edge (214),a front surface (215) and a back surface (216), wherein the top edge (211) is parallel to the bottom edge (212), wherein the first edge (213) is parallel to the second edge (214), wherein the top edge (211) is perpendicular to the first edge (213), wherein a plurality of holes (217) are disposed near the top edge (211), where a grommet (218) is inserted into each said hole (217);
      (ii) a rod support (220) firmly attached to the top edge (211) of the said back support panel (210), wherein the rod support (220) has cylindrical shape with an elongated opening (221), wherein a hard rod (222) is removably inserted into the said elongated opening (221) for stiffening the top edge (211) of the back support panel (210);
      (iii) an inner layer (230) comprising a plurality of pockets (231) disposed on the said front surface (215) of the back support panel (210), wherein the pockets (231) are adjacent to each other in parallel with top opening (232) and lower end (233), wherein the lower end (233) is aligned with the said bottom edge (212) of the said back support panel (210), wherein the top openings of the pockets (230) in the inner layer (230) are on the same height below the top edge (220) of the tool organizer (200), wherein the pockets (231) in the inner layer (230) has an inner cavity (234) extending from the said top opening (232) to the said lower end (233), wherein the pockets (231) in the inner layer (230) has the same width (235);

(iv) a middle layer (240) comprising a plurality of pockets (241) disposed in front of the inner layer (230), wherein the pockets (241) are adjacent to each other in parallel with top opening (242) and lower end (243), wherein the lower end (243) is aligned with the said lower end (232) of the said pockets (231) in the inner layer (230), wherein the top openings of the pockets (241) in the middle layer (240) are on the same height below the top openings of the pockets (231) in the inner layer (230), wherein the pockets (241) in the middle layer (240) has an inner cavity (244) extending from the said top opening (242) to the said lower end (243), wherein at least one of the pockets (241) in the middle layer (240) has a width (245) larger than the width(235) of the pockets (231) in the inner layer (230), wherein at least one of the pockets (241) in the middle layer (240) has a width (245) smaller than the width(235) of the pockets (231) in the inner layer (230);

(v) a front layer (250) comprising a plurality of pockets (251) disposed in front of the middle layer (240), wherein the pockets (251) are adjacent to each other in parallel with top opening (252) and lower end (253), wherein the lower end (253) is aligned with the said lower end (252) of the said pockets (231) in the middle layer (240), wherein the top openings of the pockets (251) in the front layer (250) are on the same height below the top openings of the pockets (241) in the middle layer (240), wherein the pockets (251) in the front layer (250) has an inner cavity (254) extending from the said top opening (252) to the said lower end (253), wherein at least one of the pockets (251) in the front layer (250) has a width (255) larger than the width (235) of the pockets (231) in the inner layer (230), wherein at least one of the pockets (251) in the front layer (250) has a width (255) smaller than the width (235) of the pockets (231) in the inner layer (230);

(vi) a back layer (260) comprising a plurality of horizontal pockets (261) disposed on the back surface (216) of the said back support panel (210), wherein the horizontal pockets (261) are adjacent to each other in parallel with an inner cavity extending from a first opening (262) to a second opening (263), wherein the first openings of all the pockets (262) in the back layer (250) are all aligned with the first edge (213) of the back support panel (210), wherein the second openings of all the pockets (263) in the back layer (250) are all aligned with the second edge (214) of the back support panel (210); and (c) a plurality of hooks (310), wherein each of the hook has a first end (311) and a second end (312), wherein the first end (311) is connected to the said second arm of the bracket (112), wherein the second arm (312) is connected to the said grommet (218), wherein the hard rod (222) rests in the hooks (310).

2. The system of claim 1, wherein the wherein the brackets (112) are made of hard materials, such as metal, metal alloy or hard plastics.

3. The system of claim 1, wherein the grommet (218) is made of made of metal, plastic, or rubber.

4. The system of claim 1, wherein back support panel (200) is made of fabrics, cloth or denim.

5. The system of claim 1, wherein the elongated opening (221) of the rod support (220) and the hard rod (222) is circular in cross-section.

6. The system of claim 1, wherein the hard rod (222) is made of hard materials, such as metal, metal alloy, hard wood or Polyvinyl chloride (PVC).

7. The system of claim 1, wherein the horizontal pockets (261) in the said back layer (260) are all the same oval shape in cross-section view.

8. The system of claim 7, wherein the horizontal pockets (261) have the longer center axis (265) parallel to the first edge (213) of the back support panel (210).

9. The system of claim 7, wherein the horizontal pockets (261) have the shorter center axis (266) perpendicular to the first edge (213) of the back support panel (210).

10. The system of claim 1, wherein the tool storage organizer system (100) further comprises a plurality of bit slots (410) disposed on the said front layer (250), wherein each bit slot comprises a top piece (420) and bottom piece (430), wherein the top piece and bottom piece are not connected, wherein both the top piece and the bottom piece are cylindrical shape with the same inner diameter, where both the top piece (420) and bottom piece (430) are aligned to the same vertical axis (415), wherein the vertical axis (415) is parallel to the first edge of the back support panel (210).

11. The system of claim 10, wherein the top piece (420) has a top opening (422) and bottom opening (424), wherein the the top opening (422) of the top piece (420) is blow the top opening (252) of the pockets (251) in the front layer (250), wherein bottom piece (430) has a top opening (432) and bottom end (434), wherein the bottom end (434) of the bottom piece (430) is above the bottom end (253) of the pockets (251) in the front layer (250), wherein the bottom end (253) of the bottom piece (430) is sealed.

12. A tool storage organizer system (100) for storing hardware tool inside a truck, the system consisting of:

(a) a truck with cabin wall (111), wherein a plurality of brackets (112) are disposed on the said wall (111), wherein the bracket (112) has a first arm (113) with a distal end and proximal end, and a second arm (114) with a distal end and proximal end, wherein the first arm (113) are attached to the said wall (112) via a secure means (115), wherein the proximal end of the second arm (114) connected to the proximal end of the first arm (113) perpendicularly, wherein the second arm (114) has an opening disposed on the arm;

(b) a tool organizer (200) to store hardware tools, wherein the tool organizer consisting of;

(i) a rectangle back support panel (210) having a top edge (211), a bottom edge (212), a first edge (213), a second edge (214),a front surface (215) and a back surface (216), wherein the top edge (211) is parallel to the bottom edge (212), wherein the first edge (213) is parallel to the second edge (214), wherein the top edge (211) is perpendicular to the first edge (213), wherein a plurality of holes (217) are disposed near the top edge (211), where a grommet (218) is inserted into each said hole (217);

(ii) a rod support (220) firmly attached to the top edge (211) of the said back support panel (210), wherein the rod support (220) has cylindrical shape with an elongated opening (221), wherein a hard rod (222) is removably inserted into the said elongated opening (221) for stiffening the top edge (211) of the back support panel (210);

(iii) an inner layer (230) consisting of a plurality of pockets (231) disposed on the said front surface (215)

of the back support panel (210), wherein the pockets (231) are adjacent to each other in parallel with top opening (232) and lower end (233), wherein the lower end (233) is aligned with the said bottom edge (212) of the said back support panel (210), wherein the top openings of the pockets (230) in the inner layer (230) are on the same height below the top edge (220) of the tool organizer (200), wherein the pockets (231) in the inner layer (230) has an inner cavity (234) extending from the said top opening (232) to the said lower end (233), wherein the pockets (231) in the inner layer (230) has the same width (235);

(iv) a middle layer (240) consisting of a plurality of pockets (241) disposed in front of the inner layer (230), wherein the pockets (241) are adjacent to each other in parallel with top opening (242) and lower end (243), wherein the lower end (243) is aligned with the said lower end (232) of the said pockets (231) in the inner layer (230), wherein the top openings of the pockets (241) in the middle layer (240) are on the same height below the top openings of the pockets (231) in the inner layer (230), wherein the pockets (241) in the middle layer (240) has an inner cavity (244) extending from the said top opening (242) to the said lower end (243), wherein at least one of the pockets (241) in the middle layer (240) has a width (245) larger than the width (235) of the pockets (231) in the inner layer (230), wherein at least one of the pockets (241) in the middle layer (240) has a width (245) smaller than the width (235) of the pockets (231) in the inner layer (230);

(v) a front layer (250) consisting of a plurality of pockets (251) disposed in front of the middle layer (240), wherein the pockets (251) are adjacent to each other in parallel with top opening (252) and lower end (253), wherein the lower end (253) is aligned with the said lower end (252) of the said pockets (231) in the middle layer (240), wherein the top openings of the pockets (251) in the front layer (250) are on the same height below the top openings of the pockets (241) in the middle layer (240), wherein the pockets (251) in the front layer (250) has an inner cavity (254) extending from the said top opening (252) to the said lower end (253), wherein at least one of the pockets (251) in the front layer (250) has a width (255) larger than the width (235) of the pockets (231) in the inner layer (230), wherein at least one of the pockets (251) in the front layer (250) has a width (255) smaller than the width (235) of the pockets (231) in the inner layer (230);

(vi) a back layer (260) consisting of a plurality of horizontal pockets (261) disposed on the back surface (216) of the said back support panel (210), wherein the horizontal pockets (261) are adjacent to each other in parallel with an inner cavity extending from a first opening (262) to a second opening (263), wherein the first openings of all the pockets (262) in the back layer (250) are all aligned with the first edge (213) of the back support panel (210), wherein the second openings of all the pockets (263) in the back layer (250) are all aligned with the second edge (214) of the back support panel (210); and (c) a plurality of hooks (310), wherein each of the hook has a first end (311) and a second end (312), wherein the first end (311) is connected to the said second arm of the bracket (112), wherein the second arm (312) is connected to the said grommet (218), wherein the hard rod (222) rests in the hooks (310).

\* \* \* \* \*